United States Patent [19]

Pfefferle

[11] Patent Number: 5,417,933
[45] Date of Patent: May 23, 1995

[54] CATALYTIC METHOD

[76] Inventor: William C. Pfefferle, 51 Woodland Dr., Middletown, N.J. 07748

[21] Appl. No.: 200,630

[22] Filed: Feb. 23, 1994

[51] Int. Cl.⁶ .............................................. B01D 53/34
[52] U.S. Cl. .................................. 422/171; 422/177; 423/212; 423/213.2; 423/213.7
[58] Field of Search ............... 422/171, 177, 180, 191, 422/222; 502/439, 527; 55/487, DIG. 30; 423/212, 213.2, 213.7

[56] References Cited

U.S. PATENT DOCUMENTS

| | | |
|---|---|---|
| 4,154,568 | 5/1979 | Kendall et al. .................. 422/171 X |
| 4,407,785 | 10/1983 | Pfefferle ........................... 422/171 X |
| 4,451,441 | 5/1984 | Ernest et al. ..................... 423/213.7 X |
| 4,521,532 | 6/1985 | Cho .................................. 502/527 X |
| 5,051,241 | 9/1991 | Pfefferle .............................. 422/180 |
| 5,306,470 | 4/1994 | Bak et al. ........................... 422/180 X |

Primary Examiner—Timothy M. McMahon
Attorney, Agent, or Firm—Kane, Dalsimer, Sullivan, Kurucz, Levy, Eisele and Richard

[57] ABSTRACT

A catalytic reactor for oxidation of carbonaceous fuels comprising an assembly of minilith catalytic elements having flow channels no longer than about three millimeters in length and spaced apart by monolith elements of greater channel diameter.

10 Claims, 2 Drawing Sheets

CATALYTIC METHOD

BACKGROUND OF THE INVENTION

1. Field of the Invention

This invention relates to improved catalytic reaction systems and to methods for catalytic reaction of carbon containing compounds. In one specific aspect the present invention relates to quick lightoff, fast thermal response catalysts for use in exhaust gas catalytic converters.

2. Brief Description of the Prior Art

Automotive emissions are still a major environmental problem in spite of the major advances brought about by the use of catalytic converters. One factor limiting the performance of catalytic converters is that pollution is not controlled during the thirty or more seconds required to bring the converter catalyst to its operating temperature. In present converters, warm-up is dependent on heating of the catalyst by hot engine exhaust gases. Although electrical heating could be utilized to preheat the catalyst prior to engine operation, the power and the time delay required with present catalyst structures, ceramic or metal, have been deemed unacceptable.

Subsequent to catalyst light-off, surface reactions on conventional monolithic catalysts such as are used in catalytic converters are mass transfer limited. Thus, the catalyst mass required for a given conversion level is much higher than if no mass transfer limitation existed at the given operating conditions. The high catalyst mass required for the required conversion level results in the relatively long heat-up times experienced, even with electrical heating.

The need to reduce catalyst warm-up time of the conventional ceramic monolith automotive catalysts to reduce emissions during the warm-up period has led to increased interest in metal monolith catalysts. However, merely substituting metal for ceramic in a conventional monolith structure yields catalysts which still have much too high a thermal mass. The short channel length catalysts of my prior U.S. Pat. No. 5,051,241 offer the low thermal mass and high conversion efficiencies required. For automotive applications, packaging of such catalysts into a rugged assembly tolerant of flow pulsations is required to meet the new 100,000 mile durability requirements.

The present invention makes possible rugged fast light-off catalytic converters for automotive engine exhaust control which utilize short channel length catalysts such as those of the above cited patent.

SUMMARY OF THE INVENTION

Definition of Terms

In the present invention the terms "monolith" and "monolith catalyst" refer not only to conventional monolithic structures and catalysts such as employed in conventional catalytic converters but also to short channel length structures of enhanced mass transfer efficiency such as woven screens.

In the present invention the term "minilith" refers to monolith elements having flow channels of less than three millimeters in length and more than forty channels per square centimeter.

For the purposes of this invention, the term "catalyst brick" refers to an assembly of minilith catalyst elements having channel flow passages less than three millimeters in length and having more than forty channels per square centimeter and spaced apart by monolith elements of larger channel size.

The terms "carbonaceous compound" and "hydrocarbon" as used in the present invention refer to organic compounds and to gas streams containing fuel values in the form of compounds such as carbon monoxide, organic compounds or partial oxidation products of carbon containing compounds.

The Invention

It has now been found that by spacing minilith catalysts apart by short monolith spacers having a channel diameter at least about fifty percent greater and more preferably more than double but less less than five times that of the spaced apart minilith catalyst elements, it is possible to avoid the blockage of channels from stacking of same size miniliths without the penalty of large unsupported minilith areas to achieve spacing of catalyst elements. Thus it is possible to clamp a minilith catalyst assembly together between two heavier screens or short monoliths to form a rugged catalyst brick, one or more of which can be mounted in a housing to form a highly efficient, fast thermal response catalytic converter. The catalysts of my prior U.S. Pat. No. 5,051,241, incorporated herein by reference thereto, are especially advantageous in the catalyst bricks of the present invention.

The low pressure drop, rugged catalyst bricks of high conversion efficiency and fast thermal response of the present invention make possible as much as a ten fold or more reduction in catalyst mass as compared to that required to achieve the same conversion in mass transfer limited reactions of hydrocarbons using conventional monoliths catalysts. As noted in the above referenced patent, it has been found that the specific mass transfer rate increases as the ratio of channel length to channel diameter of a monolith catalyst is reduced below about five to one or more preferably below about two to one and especially below about one to one. Mass transfer of reactants to the surface becomes sensitive to the inlet flow rate rather than being significantly limited by the diffusion rate through a thick laminar flow boundary layer as in conventional monolith catalysts, whether ceramic or metal. In conventional automotive monolith catalysts, the amount of pollutants oxidized is essentially independent of exhaust gas flow rate and thus percent conversion decreases with increase in flow rate. In contrast, in the minilith catalyst assemblies of the present invention, the amount of reactants oxidized typically increases with increase in flow rate. Thus if the inlet flow velocity is high enough, the reaction rate can even approach the intrinsic kinetic reaction rate at the given catalyst temperature without imposing an intolerable pressure drop. This means that it is practical to design automotive catalytic converters for much higher conversion levels than is feasible with conventional catalytic converters. Conversion levels of 99.9% or even higher are achievable in an automotive converter smaller in size than a lower conversion level conventional catalytic converter. Even conversion levels high enough for abatement of toxic industrial fumes are achievable in compact reactors.

With the short flow paths, spaced apart catalysts of the present invention, pressure drop is low permitting the use of much smaller channel diameters for a given pressure drop, further reducing catalyst mass required. The rigid structure of the catalysts bricks of the present invention allows placement of a converter close to engine exhaust ports for more rapid heatup on starting an engine at low ambient temperatures. It has also been found that channel walls as thin as 0.1 mm or even less than 0.03 mm are practical with small channel diameters thus permitting high open areas even with such small channel diameters. Thus, as many as several thousand flow channels per square centimeter or even more are feasible without reducing open area in the direction of flow below sixty percent. Open areas greater than 65, 70 or even 80 percent are feasible even with high channel density miniliths.

Inasmuch as heat transfer and mass transfer are functionally related, an increase in mass transfer results in a corresponding increase in heat transfer. Thus, not only is catalyst mass reduced by use of the minilith catalysts of this invention, but the rate at which an automotive exhaust catalyst is heated by the hot engine exhaust is correspondingly enhanced.

The reduced catalyst mass together with the increased heat transfer rate enables a short channel catalyst to reach operating temperature much sooner than would a conventional automotive catalyst. If placed sufficiently close to the engine exhaust manifold, a minilith catalyst element can even reach operating temperature in less than ten seconds without the need for electrical heating. Many alloys are commercially available which are suitable for metal miniliths of the present invention including Haynes alloy 25, Inconel 600, and even certain stainless steels. With metal microliths, alloy selection is often determined primarily by oxidation resistance at the maximum operating temperature required by the given application.

The low pressure drops possible with catalytic converters based on the present invention makes it possible to utilize a large number of small diameter elements, even as many as two hundred in a one inch length, such that the converter diameter is not significantly larger than the engine exhaust pipe. This makes it much easier to place the converter catalyst at the exit of or even in the engine exhaust manifold, resulting in even faster catalyst warm up without electrical heating, and allows use of screens of different composition to achieve both hydrocarbon and $NO_x$ control. In fume abatement applications, the large number elements feasible means that it, practical to achieve whatever conversion levels are needed, even as high as 99.999 or better.

Although this invention has been described primarily in terms of automotive emissions control, the high mass transfer rates of minilith catalyst bricks offer higher conversions and improved selectivity in many catalytic conversion processes. In particular, minilith catalyst bricks employing ultra-short channel length minilith catalysts offer superior performance in highly exothermic reactions such as the conversion of methane and other hydrocarbons to partially oxidized species such as the conversion of methane to methanol and the conversion of ethane to ethylene.

DETAILED DESCRIPTION OF THE INVENTION AND PREFERRED EMBODIMENTS

Figure 1:
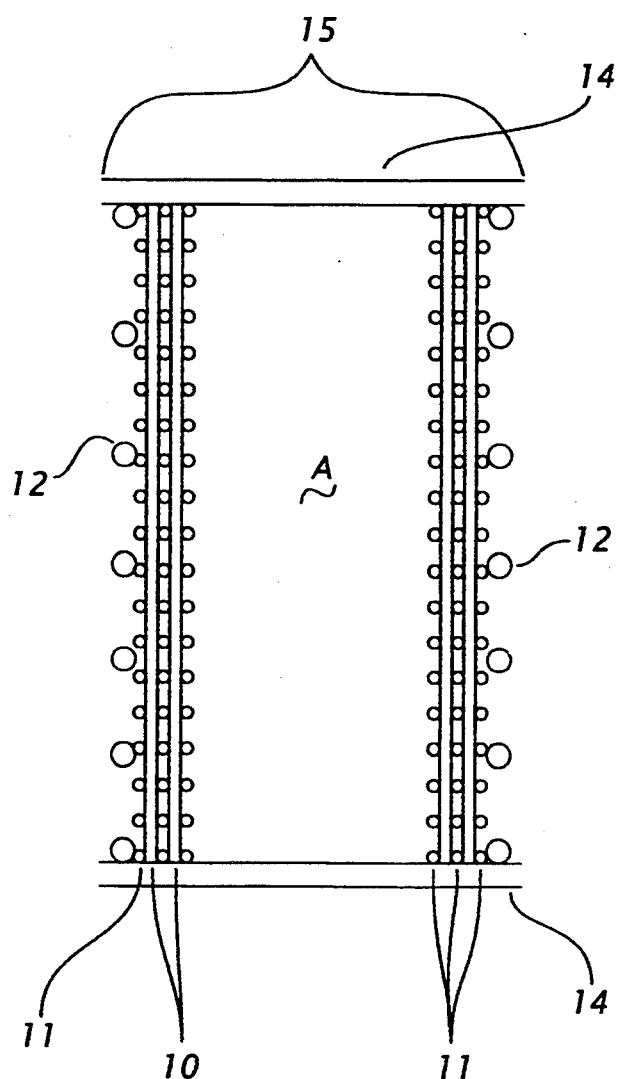
FIG. 1 shows a cross-sectional side view of a catalyst brick of the present invention showing spaced apart minilith catalyst elements.
Figure 2:
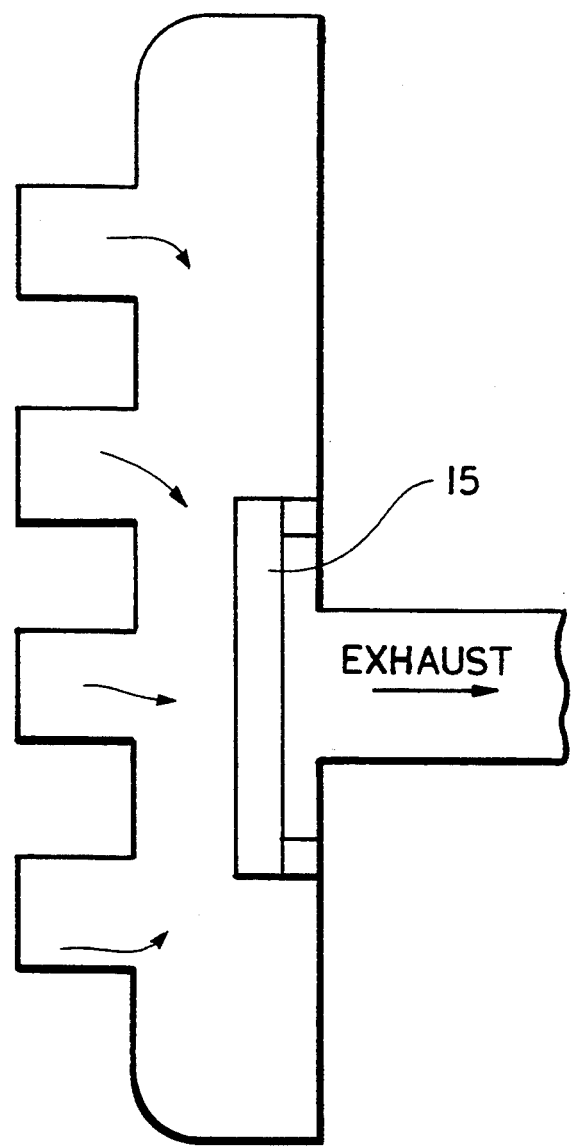
FIG. 2 show the catalyst brick mounted in an internal combustion engine exhaust manifold.

The present invention is further described in connection with the drawing. As shown in the sectional view of FIG. 1, in one preferred embodiment a minilith catalyst brick 15 comprises a plurality of minilith catalyst screens 10 having 100 or more flow channels per square centimeter and an open flow area of greater than sixty percent, separated by spacer screens 11 having 35 flow channels per square centimeter and an open area of at least sixty percent. Screens 10 are also separated from high open area clamping grids 12 by a spacer 11. Clamping grids 12 are anchored to enclosing container wall 14 to provide a rugged high open area minilith catalyst brick with minimal blockage of catalyst flow passages. In catalyst bricks for automotive catalytic converters separator screens are advantageously catalyst coated and clamping grids are screens with an open area of at least 65 percent area. For clarity, only a few screens 10,11 have been shown in the drawing, the space A having any number of screens 10,11. Advantageously, the catalyst brick has an open area in the direction of flow of at least 60 percent and more preferrably greater than 65 percent. However, open areas as low as 50 percent are desireable in certain fume abatement applications. Minilith catalyst flow channel diameters less than about one millimeter are preferred.

The catalysts of the present invention are readily made using known catalytic agents. The following examples describe means of making minilith catalysts but are not to be construed as limiting. A minilith catalyst of the present invention is made by vacuum sputtering platinum onto a stainless steel screen which has been cleaned by heating in air to 750K. Typically the platinum coating may be thinner than 100 angstroms but may be thicker for greater catalyst life. Advantageously, a similarly thin layer of ceria or alumina may be deposited prior to deposition of the platinum. Catalysts containing palladium, iridium, rhodium or other metals can be similarly prepared. In many applications, a wire screen formed from a catalytic alloy, such as a platinum doped alloy, is a sufficiently active catalyst without additional coating. Although metal miniliths are preferred, ceramic miniliths can be made such as by slicing of ceramic honeycomb extrudates prior to firing. Such ceramic honeycomb extrudates advantageously may contain an organic binder to facilitate production of thin slices. However, ceramic miniliths are most advantageously in the form of fiber mats or screens composed of long fibers spun from any desired ceramic composition, preferably catalytic ceramics. As necessary for sufficient low temperature catalytic activity, ceramic and metal miniliths may be catalyzed using various techniques well known in the art.

EXAMPLE I

A multi-element catalytic microlith automotive exhaust reactor having forty minilith catalyst elements of 250 flow channels per square centimeter is constructed using a five centimeter wide strip of 70% open area screening of platinum coated stainless steel wires having a diameter of 0.10 mm with each screen spaced apart by a downstream screen having four channels per square centimeter with platinum coated wires 0.25 mm in diameter with the assembly clamped between two heavier screens of 1.5 mm diameter wires having one channel per square centimeter to form a catalyst brick. Installed at the exhaust manifold outlet of a four cylinder automotive engine, catalyst light-off is within ten seconds of engine starting and thus exhaust emissions are controlled during initial operation of the engine.

EXAMPLE II

A fume abatement reactor six centimeters in length is constructed using 100 elements of screening with about thirty 0.050 mm wires of platinum coated nichrome per centmeter (nominally 900 flow channels per square centimeter). Each element is spaced apart from the preceeding one by a screen having nine 0.10 mm wires per centimeter. Fumes containing 50 ppm by volume of benzene in air are preheated to 700 degrees Kelvin and passed through the microlith reactor. Better than 99.9 percent conversion of the benzene to carbon dioxide and water is achieved.

I claim:

1. A catalytic reactor for the chemical conversion of carbon containing compounds, which comprises;
   a multiplicity of minilith catalytic elements spaced apart from one another by spaces consisting of monolith elements;
   said minilith catalytic elements having flow channels of less than 3 millimeters in length and more than forty channels per square centimeter;
   said monolith elements having flow channels at least fifty percent larger in diameter than the flow channels of said minilith catalyst elements.

2. The reactor of claim 1 in which the minilith elements are clamped between monolith end plates to form a catalyst brick, said endplates having an open area of at least 65 percent.

3. The reactor of claim 1 in which the flow channel diameter of said miniliths are less than about one millimeter.

4. The reactor of claim 3 in which the number density of said minilith catalyst flow channels is greater than 100 channels per square centimeter and the open area of said catalyst brick in the direction of flow is greater than about 60 percent.

5. The reactor of claim 3 in which the number density of said flow channels is at least 900 channels per square centimeter.

6. The reactor of claim 1 wherein said minilith elements have at least about 250 flow channels per square centimeter and greater than about 65 percent open area in the direction of flow.

7. The reactor of claim 6 wherein said flow channels are no longer than one millimeter.

8. The reactor of claim 1 wherein said monolith elements have flow channels at least about twice the channel diameter of said minilith elements.

9. The method of controlling automotive emissions during initial engine operation wherein engine exhaust gases are passed through an assembly of minilith catalyst elements spaced apart by spaces consisting of monolith elements, said minilith catalyst elements having flow channels of less than 3 millimeters in length and more than 40 channels per square centimeter, said monolith elements having at least about twice the channel diameter of said minilith catalyst elements.

10. The method of claim 9 wherein said minilith catalyst elements are mounted within an engine exhaust manifold.

* * * * *

UNITED STATES PATENT AND TRADEMARK OFFICE
CERTIFICATE OF CORRECTION

PATENT NO. : 5,417,933
DATED : May 23, 1995
INVENTOR(S) : William C. Pfefferle

It is certified that error appears in the above-indentified patent and that said Letters Patent is hereby corrected as shown below:

In every instance where the word "microlith" appears in this patent, it should read -- Microlith  -- .

Signed and Sealed this

Twelfth Day of November, 1996

Attest:

BRUCE LEHMAN

*Attesting Officer*  *Commissioner of Patents and Trademarks*